United States Patent
Van Mechelen et al.

(10) Patent No.: US 9,663,362 B2
(45) Date of Patent: May 30, 2017

(54) METHOD FOR RECYCLING WASTE WATER FROM A STAINLESS STEEL SLAG TREATMENT PROCESS

(71) Applicant: RECMIX BELGIUM, Sint-Truiden (BE)

(72) Inventors: Dirk Van Mechelen, Tisselt (BE); Mieke Quaghebeur, Malle (BE); Peter Nielsen, Hoeilaart (BE)

(73) Assignee: RECMIX BELGIUM, Sint-Truiden (BE)

( * ) Notice: Subject to any disclaimer, the term of this patent is extended or adjusted under 35 U.S.C. 154(b) by 4 days.

(21) Appl. No.: 14/351,937

(22) PCT Filed: Oct. 22, 2012

(86) PCT No.: PCT/EP2012/070895
§ 371 (c)(1),
(2) Date: Apr. 15, 2014

(87) PCT Pub. No.: WO2013/057317
PCT Pub. Date: Apr. 25, 2013

(65) Prior Publication Data
US 2014/0241979 A1    Aug. 28, 2014

(30) Foreign Application Priority Data

Oct. 20, 2011   (EP) .................................... 11186032

(51) Int. Cl.
*C01B 3/08* (2006.01)
*B09B 3/00* (2006.01)
*C04B 18/02* (2006.01)

(52) U.S. Cl.
CPC .................. *C01B 3/08* (2013.01); *B09B 3/00* (2013.01); *B09B 3/0041* (2013.01);
(Continued)

(58) Field of Classification Search
CPC ..................................... B09B 3/00; B09B 3/41
(Continued)

(56) References Cited

U.S. PATENT DOCUMENTS

2007/0020174 A1* 1/2007 Xu et al. ....................... 423/657
2010/0173225 A1* 7/2010 Rosenband et al. .......... 429/502
(Continued)

FOREIGN PATENT DOCUMENTS

EP    0 837 043 A1    4/1998
EP    1 312 415 A1    5/2003
(Continued)

OTHER PUBLICATIONS

International Search Report for PCT/EP2012/070895 dated Jan. 21, 2013.

*Primary Examiner* — Paul Wartalowicz
(74) *Attorney, Agent, or Firm* — Sughrue Mion, PLLC (57) ABSTRACT

The present invention relates to method for recycling alkaline waste water from a stainless steel slag treatment process wherein stainless steel slag is brought into contact with water thereby producing said waste water, which waste water contains heavy metals, including at least chromium, and has a pH of at least 12. The waste water is recycled by using it for treating an alkaline granular carbonatable material, which contains aluminum metal, in order to oxidize the aluminum metal contained therein. This material is in particular municipal waste incinerator bottom ash which can, after the treatment of the present invention, safely be used as fine or coarse aggregate in bonded applications such as concrete, mortar and asphalt. During the treatment with the alkaline waste water, hydrogen gas is produced which is captured and used to produce energy by means of a cogeneration device.

20 Claims, 2 Drawing Sheets (52) U.S. Cl.
 CPC ........ *C04B 18/021* (2013.01); *B09B 2220/06*
  (2013.01); *Y02E 60/36* (2013.01); *Y02W 30/92*
  (2015.05); *Y02W 30/94* (2015.05)
(58) Field of Classification Search
 USPC ........................................................ 423/657
 See application file for complete search history.

(56) References Cited

U.S. PATENT DOCUMENTS

2011/0100260 A1* 5/2011 Quadrio Curzio ........ B03B 9/04
  106/403
2012/0195814 A1* 8/2012 Descamps et al. ........... 423/111

FOREIGN PATENT DOCUMENTS

| EP | 2 407 440 A1 | 1/2012 |
|----|--------------|--------|
| WO | 2009/138823 A1 | 11/2009 |
| WO | 2011/020927 A2 | 2/2011 |

* cited by examiner

Fig. 1

METHOD FOR RECYCLING WASTE WATER FROM A STAINLESS STEEL SLAG TREATMENT PROCESS

CROSS REFERENCE TO RELATED APPLICATIONS

This application is a National Stage of International Application No. PCT/EP2012/070895 filed Oct. 22, 2012, claiming priority based on European Patent Application No. 11186032.6 filed Oct. 20, 2011, the contents of all of which are incorporated herein by reference in their entirety.

The present invention relates to a method for recycling waste water from a stainless steel slag treatment process wherein stainless steel slag is brought into contact with water thereby producing said waste water which contains heavy metals, including at least chromium, and which has a pH of at least 12.

Stainless steel is made from iron and contains further chromium and, depending on the type of stainless steel, also nickel and/or molybdenum. During the production of stainless steel, a slag is generated which comprises mainly calcium silicates and additionally also heavy metals such as chromium, nickel and molybdenum. The slag further comprises stainless steel particles in different sizes and a small amount of free lime (calcium oxide).

After being separated from the molten stainless steel, the liquid stainless steel slag is poured into large pits where it is allowed to cool down, partially by spraying water onto the hot steel slag. In order to reclaim the valuable stainless steel particles which are contained in the slag, the solidified slag is crushed or even ground into smaller particles from which the stainless steel particles can be removed. This can be done by hand picking, magnetic separation techniques, etc. As disclosed in EP 1 312 415 a wet jigging process can also be used to separate crushed slag particles which have a relatively high stainless steel content from those particles which contain less stainless steel. This separation process is carried out in a water bath and is based on a difference in the density of the slag particles.

Depending on their size, the stainless steel slag particles can be re-used as coarse or fine aggregate in the production of concrete or asphalt (bituminous concrete). After a fine milling, the finest particles can also be used as filler in asphalt (=bituminous concrete) or in concrete. A problem with slag aggregates is that they still contain free lime inclusions which may start to swell and thus cause cracks in the asphalt or concrete. As disclosed in EP 1 146 022 this problem can be solved by bringing the crushed stainless steel slag particles in contact with water so as to neutralize the free lime present therein. This can be done by submerging the stainless steel slag particles in water but it is preferably done by spraying water over the stainless steel slag. The neutralization water is collected and is re-used. In view of the large area required for this free lime neutralisation process, the stainless steel slag aggregates are treated outdoors. As a result thereof, in rainy periods, more water is collected which needs to be stored or even discharged. A problem in this respect is that by the repeated contact with the stainless steel slag the pH of this process water has raised to a pH value of 12 or even higher (usually higher than 12.5) so that a treatment with acid is required to meet the discharge standards. Moreover, the process water contains heavy metals, in particular chromium and usually also molybdenum, the content of which may exceed the discharge standards. In view of the different heavy metals, and the content thereof, purification of the waste water generated by the treatment of stainless steel slags is not easy and is quite costly.

An object of the present invention is to provide a new method which enables to recycle the excess of process water of the above described slag treatment processes without causing environmental problems.

To this end the method according to the present invention is characterised in that the waste water is used for treating an alkaline granular material, which contains aluminium metal, in order to oxidise the aluminium metal contained therein to produce hydrogen gas.

The alkaline granular material is in particular a carbonatable material. Such alkaline carbonatable material has a pH of at least 7.0, preferably at least 8.3 measured in accordance with the standard DIN 38414-S4.

The need to oxidise aluminium metal contained in such alkaline granular material, in particular in such alkaline granular carbonatable material, has been discussed in detail in WO 2011/020927.

As described therein, a large quantity of domestic and industrial waste materials is alkaline and comprises carbonatable substances, such as calcium and/or magnesium oxides and/or hydroxides. In order to limit the impact, both economic and environmental, of these waste materials, attempts have been made more and more to develop methods for converting these waste materials into economically exploitable materials. In this respect, it is known that the carbonation of the carbonatable substances in these waste materials, in particular calcium hydroxide, makes it possible to obtain materials having good mechanical qualities. Moreover a better retention of pollutants, in particular of heavy metals, can be achieved by such a carbonation step.

Some waste materials, such as for example municipal waste incinerator bottom ashes (MWI-bottom ashes), comprise a substantial proportion of aluminium metal. Municipal waste incinerator bottom ash consists principally of non-combustible coarse material and unburned organic matter collected in a cooling basin at the discharge from a combustion chamber of an incinerator. They are composed of solid phases formed at high temperature, some of which are maintained in a metastable state following the rapid cooling of the materials emerging from the combustion chamber. To reprocess the bottom ash, it is generally subjected to a separation of the aluminium metal by eddy currents, followed by natural ageing (weathering) of several months. During this ageing, a complex series of several interconnected chemical phenomena takes place. These phenomena include hydrolysis, hydration, dissolution/precipitation, carbonation, the formation of solid solutions and oxidation/reduction. The ageing of the bottom ash is particularly required to reduce the problems of swelling that may occur when bottom ash is used in construction, in particular as a road foundation (lean concrete) or even as a granulate in concrete. The bottom ash comprises aluminium, a significant proportion of which is in its elementary form, i.e. in the form of aluminium metal. Because of the high pH of the bottom ash, and the relatively low redox potential of aluminium, aluminium metal is oxidised and reacts with hydroxyl ions during the ageing process to form aluminates which are further precipitated into expansive $Al(OH)_3$. Consequently, $Al(OH)_3$ formation in the bottom ash during ageing is important to avoid problems of swelling when the bottom ash is used as an aggregate. Moreover, when used as aggregate in concrete the oxidation reaction of the aluminium metal as a result of the high pH of fresh and especially of setting concrete will produce hydrogen gas forming gas bubbles in the concrete and reducing thus the strength thereof. As described in "Aggregate cement reactions in MWI-bottom ash-based concrete—a petrographical assessment", B. Laenen, R. Dreesen and D. Van Rossem, International Conference on Sustainable Concrete Construction; 20020909-11; Dundee (GB), the swelling reaction caused by aluminium particles in bottom ash used as an aggregate in concrete may thus be reduced by prior natural ageing (weathering). The main disadvantage of such bottom ash ageing is however that it takes a great deal of time and requires a large amount of storage space.

During the natural ageing of the bottom ash, it swells so that subsequent problems of swelling can be avoided. This swelling is caused by the formation of an aluminium hydroxide gel. The origin of this aluminium may be twofold. It may result from:
- residual aluminium metal (packaging) that dissolves in the alkaline leachate (pH≈11 to 12), thereby producing hydrogen gas, before precipitating, in the form of hydroxide, during the relative acidification of the environment (pH≈9 to 10) following carbonation of portlandite [$Ca(OH)_2$];
- the decomposition of ettringite, a hydrated calcium sulpho-aluminate of chemical formula [$Ca_6Al_2(SO_4)_3(OH)_{12}.26H_2O$] that is produced in an alkaline environment as a result of the presence of sulphate and aluminium ions which are present in residual form in the MWI-bottom ashes.

The progressive carbonation of the portlandite [$Ca(OH)_2$] in the bottom ash causes a drop in the pH and a precipitation of calcite in accordance with the following reaction:

$$Ca^{2+}+2OH^-+CO_2(aq) \rightarrow CaCO_3(calcite)+H_2O$$

Although the bottom ash is initially highly alkaline (pH 10 to 11.8), the carbonation thereof, in particular the carbonation of portlandite, will therefore lower the pH. This acidification following the progressive carbonation of the portlandite will cause a precipitation of the dissolved aluminium forming an aluminium hydroxide gel [$Al(OH)_3$] causing a swelling of the material.

At the same time, precipitation of calcite creates a demand for $Ca^{2+}$ ions shifting the chemical balances in a way that, conjointly with the drop of the pH, will also contribute to destabilising the ettringite:

$$Ca_6Al_2(SO_4)_3(OH)_{12}.26H_2O \text{ (ettringite)}+12H^+ \rightarrow 2Al^{3+}+3SO_4^{2-}+6Ca^{2+}+38H_2O$$

$$Ca^{2+}+SO_4^{2-}+2H_2O \rightarrow CaSO_4.2H_2O \text{ (gypsum)}$$

$$Ca^{2+}+CO_2+H_2O \rightarrow CaCO_3 \text{ (calcite)}+2H^+$$

This ettringite destabilisation will therefore cause the formation of gypsum, and the additional release of $Al^{3+}$ ions that may once again lead to the formation of aluminium hydroxide with a swelling character.

These chemical reactions clearly illustrate that the swelling phases, whether it is a case of ettringite or aluminium hydroxide, are dependent on the presence of aluminium in the starting material. In addition, these phases contribute to the changing character of the bottom ash mainly on the mineralogical level and therefore questions may be posed with regard to their long-term stability. Thus, by way of example, ettringite, which has a certain capacity to trap lead, will be caused to remobilise this element when it decomposes (occurring following the reduction in the pH associated with the carbonation of the portlandite).

For this reason, the objective of the natural ageing of bottom ashes is not only a progressive carbonation of the portlandite but also and in particular a dimensional and mineralogical stabilisation of the bottom ash.

It has also been proposed to treat alkaline waste materials such as MWI bottom ash by accelerated carbonation, for example in the articles "Carbon dioxide sequestration in municipal solid waste incinerator (MSWI) bottom ash", Eva Rendek, Gaëlle Ducom and Patrick Germain, Journal of Hazardous Materials, B128 (2006) 73-79 (doi: 10.1016/j.jhazmat.2005.07.033), "Accelerated Carbonation for treatment of MSWI bottom ash", S. Aickx, T. Van Gerven and C. Vandecasteele, Journal of Hazardous Materials, Vol. 137, No. 1, September 2006, pp. 235-243 (doi: 10.1016/j.jhazmat.2006.01.059), "Artificial carbonation for controlling the mobility of critical elements in bottom ash", Jelena Todorovic, Malin Svensson, Inga Herrmann and Holger Ecke, Journal of Material Cycles and Waste Management, Vol. 8, No. 2, September 2006, pp. 145-153(9) (doi: 10.1007/s10163-006-0153-x), "Bottom Ash from Municipal Solid Waste Incineration (MSWI) in Road Construction", Holger Ecke, Katarina Kylefors, Christian Maurice and Anders Lagerkvist, International Conference on Beneficial Use of Recycled Materials in Transportation Applications, November 2001, "Evaluation of pre-treatment methods for landfill disposal of residues from municipal solid waste incineration", Kim Sang-Yul, Toshihiko Matsuto and Nobutoshi Tanaka, Waste Management and Research, 21(5), 2003, 416-423, "The Leaching Behavior of Heavy Metals in MSWI Bottom Ash by Carbonation Reaction with Different Water Content", Um Nam-II, You Kwang-Suk, Han Gi-Chun, Lee Im-Chang, Cho Kye-Hong, Ahn Ji-Whan, and Cho Hee-Chan, The Minerals, Metals and Materials Society, and "Production of lightweight aggregate from industrial waste and carbon dioxide", Peter J. Gunning, Colin D. Hills and Paula J. Carey, Waste Management, electronic publication of 3 Jul. 2009. However, the accelerated carbonation of waste still containing substantial proportions of aluminium with a view to producing a material complying with the required standards in construction comes up against significant obstacles, in particular with regard to the long-term stability of the carbonated material.

This is because such materials generally exhibit phenomena of swelling, which, for the application sought, prove to be deleterious in particular on a mechanical level, which has moreover led to fixing, in the RW 99 specification of the Walloon Region relating to the use of bottom ash in road technology, a swelling threshold value that may not be exceeded (2% after 28 days of accelerated ageing at a temperature of approximately 50° C. according to the CME-RW99-01.12.0 test method).

One drawback of accelerated carbonation is therefore that, unlike prolonged natural ageing, an accelerated carbonation does not result in the same dimensional and mineralogical stabilisation and is not in a position to solve the problems of swelling of carbonated materials, in particular carbonated bottom ash.

When bottom ashes, whether they are carbonated or not, are used as aggregate in concrete, the aluminium metal present therein reacts with the alkaline water contained in the fresh and especially in the setting concrete to produce hydrogen gas. The problem of this hydrogen gas production is described in the publication "MSWI ashes as mineral additions in concrete", L. Bertolini, M. Carsanaa, D. Cassagoa, A. Quadrio Curziob and M. Collepardia, Cement and Concrete Research, Vol. 34, No. 10, October 2004, pp. 1899-1906. The authors have found that the hydrogen production could be avoided by wet grinding the bottom ashes to an average particle size of about 3 µm, and by allowing the slurry (having a solid/liquid ratio of 1:1) to rest for a few days. In this way, the aluminium metal was oxidised to such an extent by the alkaline slurry water that no expansion was observed in concrete wherein 30% of the cement was replaced by the wet ground MSWI bottom ash. As a result of the high pH of the slurry, reaching a value of about 11.5, corrosion of the aluminium was promoted thus producing hydrogen bubbles in the slurry instead of in the concrete. This effect was not observed in dry ground bottom ash, the use of which as cement replacement led to a considerable reduction of the strength of the concrete as a result of the production of hydrogen bubbles in the concrete. Aluminium corrosion tests are described in this article which demonstrate that at a pH of 11.5 a metal aluminium plate corrodes at a rate of about 1 mg/m$^2$/day whereas at a pH of about 12.5 it corrodes at a rate which was about 100 times greater and at a pH of 13-13.5 at a rate which was even about 1000 times greater (see also the exponential increase of the aluminium and zinc corrosion rate in FIG. 1 of WO 2008/142607). Notwithstanding the fact that the bottom ashes were ground very finely (average particle size of about 3 µm) so that the aluminium metal had a large available surface, the bottom ashes required a couple of days to a couple of months of rest to end the gas development. The authors thus suggested investigating some factors which might influence the time for the exhaustion of the hydrogen evolution reaction, such as the fineness of the MSWI bottom ash particles, the temperature, the stirring conditions and a higher pH.

The use of a higher pH to reduce the aluminium metal content of the bottom ash is already described in the poster "Use of municipal solid waste incinerator bottom ash as aggregate in concrete" by K. Rübner, F. Haamkens and O. Linde, published on the website www.bam.de. The initial aluminium metal contents of coarser MSWI bottom ash aggregates of 1.22 wt. % (⅔ mm fraction), 1.59 wt. % (⁸⁄₁₆ mm fraction) and 1.06 wt. % (¹⁶⁄₃₂ mm fraction) could be reduced with a lye treatment with an NaOH solution to less than 0.4 wt. % thus avoiding damage to the concrete produced with these aggregates. A drawback of this method is that a relatively large amount of NaOH is required to raise the pH to increase the corrosion rate of the aluminium metal but that even at that high pH it takes quite a lot of time to oxidise a major part of the aluminium in view of the large particle size (and thus the relatively small surface area). Moreover, at this high pH the ettringite remains in the bottom ash and can thus still cause swelling phenomena when the pH of the bottom ashes drops, which will be especially the case when the bottom ashes are used as construction aggregates in layers which are not bonded by means of cement so that their pH may drop more quickly.

In WO 2011/020927 test results are described from which it appears that when treating bottom ash with an alkaline solution a "buffering effect" takes place so that quite a lot of alkaline material is required to raise the pH. A high pH is however required to achieve a high oxidation rate as appears from the article of Bertolini et al. discussed hereabove.

Oxidation of the aluminium metal was carried out both in Rübner and in Bertolini by means of caustic soda (NaOH). Although NaOH is quite effective in oxidising aluminium, it has two important drawbacks. A first drawback is the additional raw material cost. A second, important drawback is during the carbonation step alkali carbonates are formed which increase the alkali content of the granular material. When using such granular material as aggregate in construction material, in particular in hydraulically bonded construction materials, a high alkali content increases the risk on deleterious alkali silicate reactions by reaction of the alkali elements such as sodium and potassium with amorphous glass contained in the aggregate. By the alkali silicate reactions, an expansive silica gel is produced causing thus also cracks and swellings in the bonded material.

To solve this problem, WO 2011/020927 proposed to use an oxidising agent to oxidise the aluminium metal. However, it is clear that the use of such an oxidising agent also increases the raw material costs.

In WO 2009/138823, the aluminium metal contained in bottom ash is oxidised by wet grinding the bottom ash. In order to increase the oxidation rate, alkaline materials such as lime could be added. Since the wet grinded bottom ash has pozzolanic properties, and could be used as a cement replacement, the added lime provided an additional value as it improved the hydraulic properties of the material. This is however not the case when the bottom ashes are not finely ground. WO 2009/138823 also proposes to use by-products of residues of other industrial processes, such as for example the alkaline water coming from aluminium pickling processes. This waste water contains however also large amounts of sodium (caustic soda), thus reducing the quality of the bottom ash in hydraulically bonded applications. A same wet grinding process is disclosed in WO 2008/142607. During the wet grinding the pH of the sludge is increased by adding bases or alkaline process water and wash water. WO 2008/142607 discloses however that such a treatment is deleterious when the treated bottom ash is to be used in concrete since the high alkali content is one of the most serious and uncontrolled causes of concrete degradation due to the well-known "alkali/aggregate" reaction, which causes harmful expansions and pop-outs. In WO 2008/142607 the treated finely crushed bottom ash was therefore not used in hydraulically bonded applications.

In the method according to the present invention, use is now made of alkaline waste water from a stainless steel slag treatment process. Such a waste water contains no or only small amounts of alkali elements such as sodium and potassium. On the other hand, it contains calcium. During the subsequent carbonation, this calcium forms calcium carbonate which improves the mechanical properties of the granular material and which may also assist in immobilising heavy metals.

In an advantageous embodiment of the method according to the invention, the alkaline granular material is introduced in a bath containing said waste water to produce said hydrogen in said bath, the amount of alkaline granular material introduced in said bath being less than 100 wt. %, preferably less than 50 wt. %, more preferably less than 25 wt. % and most preferably less than 10 wt. % of the amount of waste water (dry weight) contained therein.

The use of such an excess of alkaline water is no problem in the method according to the present invention since large amounts of alkaline waste water are available in a stainless steel treatment plant. An advantage of such an excess of alkaline water is that the pH of the mixture of alkaline granular material and alkaline waste water will substantially be equal to the pH of the alkaline waste water, notwithstanding the buffering substances contained in the alkaline granular material.

The pH of both the mixture and of the alkaline waste water is preferably higher than 12, more preferably higher than 12.5 and most preferably higher than 12.75. Higher pH values of higher than 13 and preferably of higher than 13.25 are even more preferred.

Such pH values can be found in the waste water resulting from the repeated spraying of piles of stainless steel slags to neutralize the free lime contained therein. In rainy seasons, the highest pH values may however not be achieved. However, very high pH values are always achieved in the water of the wet jigging apparatus, the pH value of this water is usually equal to about 14, so that this water can be used either as such or in admixture with the waste water resulting from the spraying of the stock piles.

Due to the more acidic compounds contained in the bottom ash (bottom ash has a pH of less than 12), the introduction of said alkaline granular carbonatable material in said water bath reduces the pH of the waste water contained therein. The pH of this waste water is preferably maintained at a predetermined level, in particularly at a the levels of the mixture of alkaline granular material and alkaline waste water defined hereabove, by adding additional waste water from the stainless steel slag treatment process. In case of an excess of waste water in the water bath, at least a portion of this excess of waste water is recycled preferably to said stainless steel slag treatment process.

In a preferred embodiment of the method according to the invention, additional value is created by capturing the hydrogen gas which is produced during the oxidation of the aluminium (and optionally other amphoteric metals such as zinc). The hydrogen gas can easily be captured when the aluminium metal is oxidised in a water bath, in particular by placing an inverted vessel ("bell") into the water bath. The inverted vessel can be made to raise and sink depending on the amount of water captured above the water level in the vessel.

The produced hydrogen gas is preferably used to produce energy by means of a cogenerator (=combined heat and power generating) device.

When the alkaline granular material is "dry" when it is introduced in the water bath, it will absorb an amount of waste water which thus needs to be replenished again.

After having produced said hydrogen gas, the alkaline granular carbonatable material is preferably subjected to an ageing process wherein the alkaline granular carbonatable material is brought in contact with a gas that contains carbon dioxide to carbonate said carbonatable material, said gas being either air but is preferably a gas containing more than 1 wt. %, preferably more than 5 wt. % and more preferably more than 10 wt. % of carbon dioxide. During this ageing process, aluminium metal which has not yet been oxidised is allowed to oxidise further.

During the ageing process, the carbonatable material is carbonated preferably until its pH, measured in accordance with the standard DIN 38414-S4, is lower than 10, preferably lower than 9.5 and more preferably lower than 9.

During the ageing process water contained in the alkaline granular carbonatable material is moreover preferably allowed to evaporate. The alkaline granular carbonatable material is usually shielded of from the rain to be able to control the water content thereof (in order to be able to optimize the carbonation and further oxidation processes). The water content is preferably maintained during said ageing process between 5 and 90 wt. %, more preferably between 7 and 75 wt. % and most preferably between 10 and 50 wt. %. At least a portion of the evaporated water is replaced by a further portion of the waste water which is applied, preferably by spraying, onto the alkaline granular carbonatable material. In this way, a further portion of the waste water from the stainless steel slag processing can be consumed.

As explained hereabove, the carbonates formed during the carbonation step may assist in immobilising the heavy metals, i.e. both the heavy metals which were already contained in the alkaline granular material and the heavy metals which are contained in the waste water. In order to further immobilise these heavy metals, at least a portion of the carbonated (aged) material is used as construction aggregate, in particular to produce a layer which is bonded by means of a hydraulic binding agent. The hydraulic binding agent may be cement or another hydraulic binding agent such as fly ash or even a fine fraction of the bottom ash itself (preferably combined with a lime in view of its pozzolanic properties). When they are applied at a sufficient level above the ground water level, and enclosed within barriers, the alkaline granular material can also be used as aggregate in unbound applications.

The portion of the carbonated material which is used as construction aggregate preferably comprises particles having a size (measured with a sieve) greater than 1 mm, preferably greater than 2 mm, more preferably greater than 4 mm and most preferably greater than 6 mm. Such construction aggregates can be used in large quantities so that quite large amounts of waste water can be recycled in this way.

In case a fine fraction of the alkaline granular material is treated with the waste water in accordance with the present invention, it is possible to produce a coarser granular material from this fine granular material by pelletising it before the material is carbonated. The pellets are formed by the agglomerated particles of the alkaline granular material. By carbonating these pellets so that carbonate phases are formed, their mechanical strength can be increased. The use of the waste water according to the invention is advantageous in this case in that the waste water supplies additional calcium which can be carbonated. Moreover, the metal oxides produced by the oxidation of aluminium and possibly other amphoteric metals such as zinc can also be carbonated. Bottom ashes as such contain indeed only a relatively small amount of carbonatable substances so that an increased strength can be obtained by carbonating the carbonatable material after the oxidation step.

Since coarser particles are easier to treat with the waste water, in particular since coarser particles are easier to pass through a bath of this waste water, and since notwithstanding the larger size of the particles the process according to the invention still enables to oxidise most of the aluminium metal contained therein (due to the high pH and the large amount of waste water which is available, and which even has a negative cost), the alkaline granular material which is brought in contact with said waste water to produce said hydrogen gas contains preferably particles with a size greater than 1 mm, preferably greater than 2 mm and more preferably greater than 4 mm. In the process disclosed in WO 2009/138823, on the contrary, the bottom ash material has to be grinded very finely to enable to oxidise the aluminium metal with a minimum excess of water (in order to reduce the amount of basic and/or alkaline agents needed for this oxidation) and to enable to use the pozzolanic properties of the finely grinded material as mineral additive to for example cement.

Since larger aluminium particles are more difficult to oxidise completely, and since aluminium is a valuable raw material, just like other metals, the non-ferrous and preferably also the ferrous metals contained in the alkaline granular material, are preferably removed therefrom before the alkaline granular material is treated with the alkaline waste water. Ferrous metals can be removed from the granular material by magnetic separation techniques whilst non-ferrous metals can be removed by means of separation techniques based on eddy currents.

Other particularities and advantages of the invention will become apparent from the following description of a particular embodiment of the method according to the present invention. The reference numerals used in this description relate to the annexed drawings wherein:

The present invention generally relates to a new method for recycling waste water generated during the processing of stainless steel slag. Stainless steel contains mainly iron and further at least chromium and optionally other heavy metals such as nickel and molybdenum. During the production of stainless steel, calcium and magnesium oxides/carbonates (f.e. burned lime, calcite, dolomite and magnesite) are added to the furnace (in particular an electric arc furnace) to produce a liquid slag on top of the molten slag. This slag acts as a destination for oxidised impurities. After the steel making process, the slag is poured into pits and is allowed to cool down. To accelerate the cooling process, water is sprayed onto the hot slag. During the cooling process, different amorphous and crystalline phases are formed, including calcium silicates.

The solidified pieces of stainless steel slag are crushed to produce fine or coarse aggregates which can be used in particular for producing concrete or asphalt (=bituminous concrete) (see EP 0 837 043 which is incorporated herein by reference). As disclosed in EP 2 160 367 the crushed stainless steel slag particles can also be further grinded or milled to a very small particle size, in particular to a particle size smaller than 63 µm so that the grinded stainless steel slag particles can be used as a filler in concrete (in particular self-compacting concrete) or in asphalt. Crushing/grinding of the stainless steel slag enables to recover as much as possible of the valuable stainless steel which is contained in stainless steel slag. This can be done by hand picking, magnetic separation techniques or density separation techniques. A preferred density separation technique is the wet jigging technique which is disclosed in EP 1 312 415. This European patent application is also incorporated herein by reference. In this wet jigging technique, the stainless steel slag particles are made to float in water so that they can be separated based on their density.

Fresh stainless steel slag always still contains some free lime (i.e. CaO). This free lime may be present in the form of small or larger inclusions in the stainless steel slag particles. When used as aggregate for concrete or asphalt, it is important that this free lime is neutralised since when the free lime inclusions come into contact with water, they may start to swell thus causing cracks in the concrete or asphalt. To solve this problem, the crushed/grinded stainless steel slag particles are brought in contact with water to neutralise the free lime contained therein. As disclosed in EP 1 146 022, which is incorporated herein by reference, this can be done by immersing the stainless steel slag particles in a bath of water or the water can be sprayed onto the stainless steel slag particles.

By being brought in contact with the stainless steel slag particles, the pH of the neutralisation water rises and also its heavy metal content. The neutralisation water is therefore collected in one or more reservoirs and is re-used for the neutralisation process. Although part of this water also evaporates, there is a surplus of water during rainy periods. Consequently, part of the neutralisation water needs to be discharged. Also the water used in the wet jigging installation needs to be refreshed from time to time and needs thus also to be discharged.

The waste water produced by neutralising the free lime in the stock piles has a pH higher than 12, in particular higher than 12.5 and usually even higher than 12.75. Depending on the amount of rain fall, the pH may even be higher. The pH of the water contained in the wet jigging installation is not dependent on the rain fall, and is usually about equal to 14. The pH of this waste water is thus higher than 13 and in particular higher than 13.25. Due to its very high pH, it can be used to raise the pH of the waste water (or a portion thereof) which is used to neutralise the free lime in the stainless steel slags.

In accordance with the present invention, excess of waste water of the stainless steel slag processing plant is used to treat an alkaline granular material, in particular an alkaline granular carbonatable material, which contains aluminium metal in order to oxidise this aluminium metal so as to produce hydrogen gas. This alkaline granular material is in particular municipal waste incinerator bottom ash (MWI-bottom ash).

MWI-bottom ash consists essentially of mineral material and is like a greyish gravel in which residues such as bottle glass, ceramics, scrap iron and non-ferrous metals can be identified.

This is a fairly heterogeneous material since microscopic observation reveals the presence of two distinct zones:

so-called "slaggy" zones, with low density because of its vacuolar structure and which comprises melting residues such as non-molten bottle glasses, metal debris, etc, and glassy zones which may either be in the completely amorphous state or contain mineral phases formed at high temperature (typically calcium silicates), the dendritic structure of which testifies to rapid cooling during a quenching step.

The composition of the bottom ash therefore proves to be extremely complex and, among the main constituents, there are generally:

a glassy matrix resulting from the quenching of a liquid silicate;

minerals formed at high temperature that consist generally of silicates and oxides;

species neoformed at low temperature at the discharge from the furnace, including mainly portlandite [Ca(OH)$_2$] issuing from the hydration of the lime that occurs during the quenching undergone by the bottom ash, carbonates and, to a lesser extent, chlorides;

calcium sulphates, which may be present in residual form or be formed either at high temperature, by oxidation of the SO$_2$ issuing from the combustion and reaction thereof with the calcium mobilised in the furnace, or at low temperature by precipitation during the quenching by capture of the SO$_2$ by the water in combination with the available calcium;

metals (Al, Cu, Fe) and alloys (Pb—Al) coming from residual fragments issuing from the incinerated waste;

relic phases that are mainly constituent minerals such as quartz, potassium, feldspars and glass debris that has not melted;

unburned materials that correspond to combustible organic material that has not resided for long enough in the furnace or that was protected by other compounds by an encapsulation effect.

In the prior art, generally a natural aging of the bottom ash is carried out for several months before using it as a construction material. This aging step is highly complex since it comprises several phenomena: slow oxidation of the unburned materials, carbonation of the lime that leads to a reduction in pH responsible for the destabilisation of ettringite [$Ca_6Al_2(SO_4)_3(OH)_{12}.26H_2O$], oxidation/hydroxylation of the aluminium and oxidation/hydroxylation of the iron. One drawback of this natural aging is that it takes a great deal of time and space. The purpose of this aging processing of the MWI-bottom ash is intended firstly to stabilise it in particular on a dimensional level and secondly to fix the heavy metals within the neoformed phases. This is because the carbonates, in precipitating, are liable to trap the trace elements such as cadmium, lead and zinc whereas the same elements with in addition copper and manganese appear to have great affinity for the iron and aluminium (hydr)oxides.

If the bottom ash is used without sufficient aging, swelling phenomena caused in particular by the subsequent formation of aluminium hydroxides from aluminium metal and ettringite still present in the bottom ash may take place.

Bottom ash subjected solely to accelerated carbonation still contains a substantial amount of non-oxidated aluminium metal, which may pose swelling problems. Bottom ash is first of all subjected to an initial step of separation of aluminium metal by eddy currents in order to recover as much as possible of the aluminium metal. A magnetic separation is also carried out to recover iron. Further metal recovery steps can optionally be performed after having crushed the bottom ash to a smaller particle size. The thus obtained bottom ash still contains at least 0.1% by dry weight, in particular at least 0.3% by dry weight and more particularly at least 0.5% by dry weight of aluminium metal. Usually it contains less than 5% by dry weight of aluminium metal, in particular between 0.8 and 2.5% by dry weight of aluminium metal. Next, the bottom ash is treated with the alkaline waste water to oxidise this aluminium metal.

Figure 1:
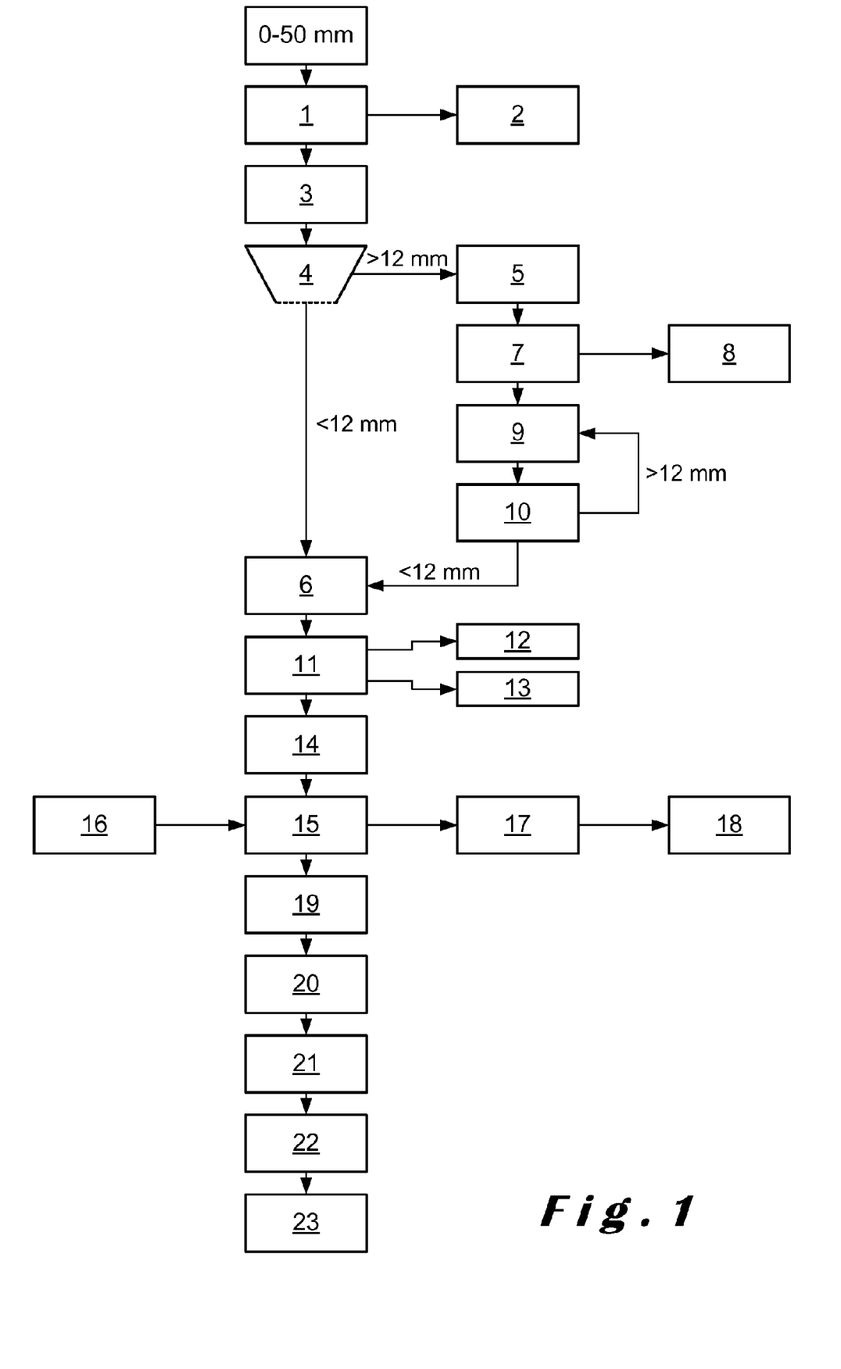
FIG. 1 is a flow chart of a bottom ash treatment process in accordance with the present invention.

FIG. 1 illustrates an example of a flow chart of a bottom ash treatment process.

The MWI-bottom ash supplied to this process has preferable been subjected to a preliminary sieving/crushing operation so that it has a predetermined particle size ranging for example from 0 to 50 mm. The smallest fraction may optionally be removed from this bottom ash, in particular a fraction of 0 to x mm, with x being larger than 1 mm but preferably smaller than 5 mm. The preliminary process for preparing the bottom ash is preferably a dry process, wherein the smallest particles can be removed for example by means of a wind sifting process. The preliminary process may however also be a wet process, wherein the bottom ash is also washed, in particular to lower its content of water soluble salts, the smaller particles being preferably removed during this washing/sieving step.

In a first step 1 of the flow chart illustrated in FIG. 1 the bottom ash is passed underneath a top belt magnet to recycle ferrous metals 2. The remaining bottom ash 3 is then subjected to a sieving step 4 wherein the bottom ash 3 is divided in a fraction 5 which has a particle size greater than 12 mm (i.e. which doesn't pass through a 12 mm sieve) and in a fraction 6 which has a particle size smaller than 12 mm (i.e. which passes through a 12 mm sieve). From the bottom ash fraction 5 the non-ferrous metals (in particular aluminium) 8 are removed by means of an eddy current separating device 7. The remaining bottom ash fraction 9 is then crushed in step 10 to achieve bottom ash having a particle size smaller than 12 mm. The crushed bottom ash is added to fraction 6 whilst the oversize is recycled to fraction 9 in order to be crushed again.

In the next step 11, further ferrous 12 and non-ferrous metals 13 are removed from the finer bottom ash 6. This can be done by eddy currents, sink float, upstream column, jigging, top belt magnet, hydrocyclone and/or wind sifting techniques.

Figure 2:
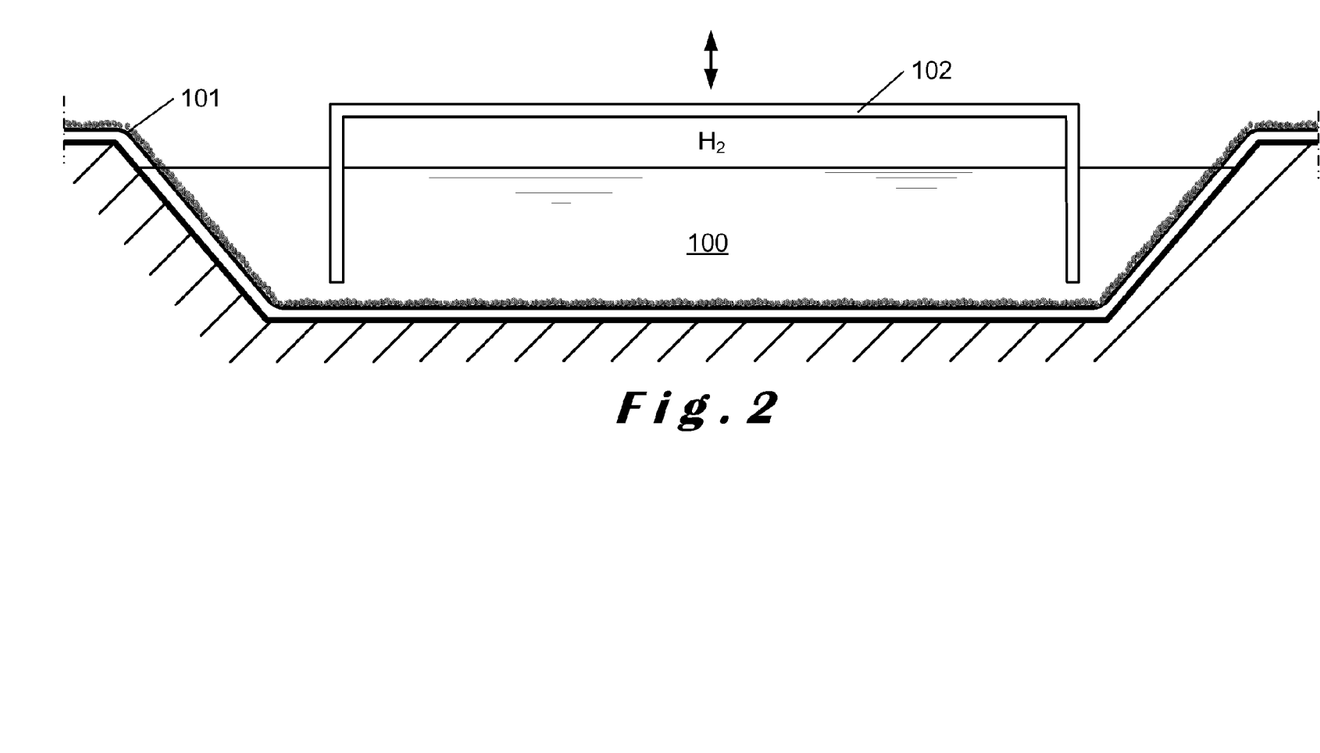
FIG. 2 is a schematic drawing of a water bath wherein bottom ash is treated by the method according to the present invention and wherein the produce hydrogen gas is captured underneath a bell.

The thus obtained bottom ash 14 is treated in the next step 15 with waste water 16 from the stainless steel slag treatment process. This very alkaline waste water is preferably contained in a water bath 100, as illustrated schematically in FIG. 2, and the bottom ash is passed, preferably continuously, through this water bath 100. In FIG. 2 the bottom ash is guided through the water bath 100 by means of a conveyor system 101. However, it is also possible to generate a fluid flow in the water bath conveying the bottom ash through the water bath. Preferably, the bottom ash is contained in a fluidized bed in order to optimize the contact between the alkaline waste water and the bottom ash and especially also to remove gas bubbles which are produced in the bottom ash and which have a tendency to adhere thereto (and thus disturb the chemical reactions). When passing the alkaline granular material through the water bath, the waste water can be passed in counter-current with this granular material through the water bath.

In the water bath amphoteric metals contained in the bottom ash, in particular aluminium, reacts under the highly alkaline conditions to produce water. This reaction can be represented as follows:

$$2Al + 2OH^- + 4H_2O \rightarrow 2[Al(OH)_2]^- + 3H_2$$

The thus produced hydrogen gas is preferably captured. This can be done by guiding the bottom ash in tubes through the water bath, the tubes being inclined so that the hydrogen gas can be captured at one extremity of these tubes. In FIG. 2, the hydrogen gas is however captured in a bell 102 which is placed into the water bath. Initially, this bell is completely filled with water. When hydrogen gas is released from the bottom ash passing underneath the bell, this hydrogen gas raises and accumulates within the bell. When more hydrogen gas is captured, the bell may rise, the lower edge of the bell remaining in the water bath to form a water lock preventing the escape of hydrogen gas.

The hydrogen gas captured in the bell is used to produce energy. This is preferably done by means of a combined heat and power generating device (cogeneration plant or installation).

In the water bath most of the aluminium metal may have been oxidised, in particular more than 50 wt. %, preferably more than 75 wt. %, for example about 80 wt. %. The bottom ash 19 leaving the waste water treatment step 15 is preferably subjected to an accelerated carbonation step 20 wherein the bottom ash is brought in contact with a gas which contains more $CO_2$ than air. This gas may contain more than 1 wt. %, preferably more than 5 wt. % and more preferably more than 10 wt. % of carbon dioxide. The gas may be a flue gas providing not only carbon dioxide but optionally also heat to dry the bottom ash.

The accelerated carbonation is preferably performed in a rotary drum, and this for example for 4 to 5 hours. Combustion gases, such as for example household waste incineration fumes or the fumes produced by the stainless steel plant, are introduced into the drum in order to obtain a hot atmosphere (approximately 50° C.) enriched with carbon dioxide (approximately 10% to 12%). However, a humidity level equal to or greater than 80% is maintained in the atmosphere of the drum rather than the usual 30% of household waste incineration fumes. Before being introduced in the rotary drum, the bottom ash can be put in a pile and the water contained therein can be allowed to drain. The recovered water can be returned to the water bath.

After the carbonation treatment, the bottom ash has preferably a pH lower than 10, preferably lower than 9.5 and more preferably lower than 9. The pH of the granular material is measured in accordance with the standard DIN 38414-S4. Although the pH of the bottom ash material has been raised by the treatment with the alkaline waste water 16, the pH of this material can be lowered by the carbonation treatment quite easily again since the additional hydroxides which in the pore water react quickly with the carbon dioxide dissolved therein to produce carbonates.

In a next step 21 the bottom ash is then subjected to a natural ageing process wherein further chemical reactions (such as a further destabilisation of the ettringite) and a further drying of the material take place. During this natural ageing the bottom ash is shielded of from the rain to be able to control its moisture content. However, due to the drying of the bottom ash, the water content may become too low so that it is necessary to spray water onto the bottom ash. This water is preferably also waste water from the stainless steel slag treatment process, possibly after this water has already been used in the water bath 100 (for example the water draining out of the treated bottom ash material). The bottom ash thus becomes sufficiently stable to be useful as coarse or fine (sand) aggregates, not only in unbound applications but also in bound applications such as concrete or mortar and asphalt (bituminous mixes).

The coarse and fine aggregate fractions can be sieve out from the treated bottom ash in step 22 and can be used in step 23 in bound applications such as concrete.

The stainless steel slag processing installation and the bottom ash treatment installation are preferably provided on one site. An advantage of the method of the invention is that the excess of waste water generated during the processing of stainless steel slag can be recycled for the treatment of the bottom ash so that no, or at least less, waste water needs to be purified and discharged.

The use of the waste water for the treatment of bottom ash enables to produce valuable hydrogen gas, in contrast to only a natural weathering of the bottom ash. Moreover, the aluminium metal contained in the bottom ash is oxidised/removed to a much larger extent than in a natural weathering process, so that it is thus safer to use the treated bottom ash as fine or coarse aggregate. During a natural ageing process, most of the aluminium metal is passivated by an oxide layer whereas in the method of the present invention this oxide layer is dissolved and nearly all of the aluminium is oxidised.

The method of the present invention also offers the advantage that during the carbonation step more metal oxides/hydroxides are available which can be carbonated and which can thus be used to immobilise the heavy metals. These metal oxide/hydroxides are not only those contained in the waste water but also those produced by the oxidation of the metals in the bottom ash. Moreover, the calcium (and magnesium) contained in the waste water also contributes to the formation of carbonates. These carbonates assist not only in immobilizing heavy metals but improve also the mechanical properties of the material. Moreover, when pelletizing the bottom ash particles before the carbonation step to produce a coarser granular material, the carbonates also contribute to a greater strength of this coarser granular material.

Although the present invention has been described with reference to specific example embodiments, it is obvious that various modifications and changes can be made to these examples without departing from the general scope of the invention as defined by the claims. For example, other carbonatable materials than bottom ash could be treated in this way, such as for example slag from aluminium production, or residues from the extraction and/or processing of metals, alone or mixed with a carbonatable binder, such as cement. In addition, although the granulometry of the resulting material may normally be simply adjusted by screening of the treated material, in particular in such a way that the carbonatable material contains particles with a size greater than 1 mm, preferable greater than 2 mm, and even more preferably greater than 4 mm, it is also possible to obtain, from a starting material with an excessively fine granulometry, a material with such a granulometry by adding to the treatment process a pelletisation step before or during the carbonation, so that the calcic matrix formed during the carbonation functions as a binder of fine particles in grains with larger dimensions. Consequently the description and drawings must be considered in an illustrative rather than restrictive sense.

The invention claimed is:

1. A method for recycling alkaline waste water from a stainless steel slag treatment process wherein stainless steel slag is brought into contact with water thereby producing said waste water, which waste water contains heavy metals, including at least chromium, and has a pH of at least 12.5, in which method said waste water is used for treating an alkaline granular carbonatable material, which contains between 0.1 and 5% by dry weight of aluminium metal, in order to oxidise the aluminium metal contained therein so as to produce hydrogen gas, the method comprising the steps of:
   introducing the alkaline granular material in a bath containing a portion of said waste water to produce said hydrogen in said bath, the amount of alkaline granular material introduced in said bath being less than 100 wt. % of the amount of waste water contained therein;
   maintaining the pH of the waste water contained in said bath at a predetermined level higher than 12.5 by adding additional waste water from said stainless steel slag treatment process and in case of an excess of waste water in the water bath, at least a portion of this excess of waste water is recycled;
   removing the alkaline granular material from said bath after having produced the hydrogen gas therein;
   subjecting the alkaline granular material which is removed from said bath but which still contains water to an aging process wherein the alkaline granular carbonatable material is brought in contact with a gas containing carbon dioxide to carbonate said carbonatable material until its pH, measured in accordance with the standard DIN 38414-S4, is lower than 10;
   allowing water which is contained in the alkaline granular material to evaporate during said aging process; and
   replacing at least a portion of the evaporated water by a further portion of said waste water which is applied during said ageing process onto the alkaline granular material.

2. The method as claimed in claim 1, wherein the produced hydrogen gas is captured in and/or above said water bath.

3. The method as claimed in claim 2, wherein the alkaline granular material is passed through said water bath.

4. The method as claimed in claim 3, wherein the alkaline granular material is maintained in a fluidized bed when passing through said water bath.

5. The method as claimed in claim 3, wherein said waste water is passed in counter-current with said alkaline granular material through said water bath.

6. The method as claimed in claim 1, wherein said predetermined level at which the pH of the waste water contained in said bath is maintained is higher than 12.75.

7. The method as claimed in claim 1, wherein said waste water has a pH higher than 12.75.

8. The method as claimed in claim 1, wherein the amount of alkaline granular material introduced in said bath is less than 50 wt. % of the amount of waste water contained therein.

9. The method as claimed in claim 1, wherein the introduction of said alkaline granular carbonatable material in said water bath reduces the pH of the waste water contained therein, the pH of this waste water being maintained at a predetermined level by adding additional waste water from said stainless steel slag treatment process, in case of an excess of waste water in the water bath, at least a portion of this excess of waste water is recycled preferably to said stainless steel slag treatment process.

10. The method as claimed in claim 1, wherein the produced hydrogen gas is captured and used to produce energy.

11. The method as claimed in claim 1, wherein after having produced said hydrogen gas but before being carbonated the granular carbonatable material is pelletised to produce a coarser granular material wherein the particles of said carbonatable material are agglomerated.

12. The method as claimed in claim 1, wherein at least a portion of the carbonated material is used as a construction aggregate.

13. The method as claimed in claim 1, wherein said granular material contains at least bottom ash of an incinerator.

14. The method as claimed in claim 1, wherein non-ferrous metals are removed from the alkaline granular material before treating this material with said waste water.

15. The method as claimed in claim 1, wherein at least a portion of said waste water is produced by bringing stainless steel slag in contact with water in order to neutralise (hydrate) free lime contained therein.

16. The method as claimed in claim 1, wherein at least a portion of said waste water is produced in a wet jigging apparatus wherein stainless steel slag particles are separated based on their density in particles which contain stainless steel content and particles which contain no or less stainless steel.

17. The method as claimed in claim 1, wherein the alkaline granular material which is brought in contact with said waste water to produce said hydrogen gas comprises less than 2.5% by dry weight of aluminium metal.

18. The method as claimed in claim 1, wherein the alkaline granular material which is brought in contact with said waste water to produce said hydrogen gas contains particles with a size greater than 1 mm.

19. The method as claimed in claim 1, wherein the amount of alkaline granular material introduced in said bath is less than 25 wt. % of the amount of waste water contained therein.

20. The method as claimed in claim 1, wherein the amount of alkaline granular material introduced in said bath is less than 10 wt. % of the amount of waste water contained therein.

* * * * *